(12) United States Patent
Benoit et al.

(10) Patent No.: US 11,684,194 B2
(45) Date of Patent: *Jun. 27, 2023

(54) MODULAR FOOD PROCESSING AND PREPARATION DEVICE

(71) Applicant: WHIRLPOOL CORPORATION, Benton Harbor, MI (US)

(72) Inventors: Kaitlyn M. Benoit, St. Joseph, MI (US); Michael P. Conti, St. Joseph, MI (US); John Dykhouse, Benton Harbor, MI (US); Timothy J. Hicks, Berrien Springs, MI (US); Mitchell L. Robertson, Elkhart, IN (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,194

(22) Filed: Jul. 6, 2022

(65) Prior Publication Data

US 2022/0330736 A1  Oct. 20, 2022

Related U.S. Application Data (63) Continuation of application No. 17/026,687, filed on Sep. 21, 2020, now Pat. No. 11,406,214, which is a
(Continued)

(51) Int. Cl.
*A47J 17/18* (2006.01)
*A47J 43/06* (2006.01)
(Continued)

(52) U.S. Cl.
CPC .............. *A47J 17/18* (2013.01); *A47J 17/16* (2013.01); *A47J 25/00* (2013.01); *A47J 43/06* (2013.01)

(58) Field of Classification Search
CPC .. A47J 17/00; A47J 17/14; A47J 17/16; A47J 17/18
See application file for complete search history.

(56) References Cited

U.S. PATENT DOCUMENTS

| 62,184 A | 2/1867 | Coe |
|---|---|---|
| 100,280 A | 3/1870 | Gerhard |

(Continued)

FOREIGN PATENT DOCUMENTS

| CN | 2536142 Y | 2/2003 |
|---|---|---|
| DE | 971304 C | 1/1959 |
| EP | 2777447 A1 | 9/2014 |

*Primary Examiner* — Janie M Loeppke
(74) *Attorney, Agent, or Firm* — Price Heneveld, LLP (57) ABSTRACT

A food processing system includes a base unit having a gear housing, a frame arm extending from the gear housing on a first lateral side thereof, a drive screw extending between and operably coupled on respective ends thereof with the gear housing and a support end of the frame arm, and a retention fitting extending from the gear housing. An input hub extends from the gear housing opposite the drive screw and the retention fitting and is operably engaged with both the drive screw and the retention hub to drive synchronized rotational movement thereof with respect to the gear housing. A carrier is slidably coupled with the frame arm and is operably engaged with the drive screw. The system further includes a first cutting implement and a second cutting implement, each being alternately coupleable with the carrier.

20 Claims, 11 Drawing Sheets

Related U.S. Application Data continuation of application No. 14/983,735, filed on Dec. 30, 2015, now Pat. No. 10,820,735.

(60) Provisional application No. 62/128,848, filed on Mar. 5, 2015.

(51) Int. Cl.
    *A47J 17/16*    (2006.01)
    *A47J 25/00*    (2006.01)

(56) References Cited

U.S. PATENT DOCUMENTS

| | | | |
|---|---|---|---|
| RE9,774 E | 6/1881 | Whittemore |
| 243,035 A | 6/1881 | Geer |
| 256,214 A | 4/1882 | Heizmann |
| 256,800 A | 4/1882 | Holton |
| 273,418 A | 3/1883 | Whittemore |
| 310,196 A | 1/1885 | Goodell |
| 346,585 A | 8/1886 | Davison |
| 1,006,621 A | 10/1911 | Arnold |
| 1,008,555 A | 11/1911 | Mower |
| 2,069,654 A | 2/1937 | Jeppsson et al. |
| 2,130,980 A | 9/1938 | Chattin et al. |
| 2,156,645 A | 5/1939 | Waller |
| 2,410,683 A | 11/1946 | Marquez |
| 2,461,249 A | 2/1949 | Anderson |
| 2,464,993 A | 3/1949 | Ross |
| 2,508,868 A | 5/1950 | Ross |
| 2,693,210 A | 11/1954 | Gustafson |
| 2,781,175 A | 2/1957 | Metzger |
| 2,931,404 A | 4/1960 | Gildo |
| 3,009,658 A | 11/1961 | William |
| 3,211,202 A | 10/1965 | Mason |
| 3,357,469 A | 12/1967 | Pease et al. |
| 3,374,818 A | 3/1968 | Knoedler |
| RE26,684 E | 10/1969 | Mason |
| 3,881,406 A | 5/1975 | Perez |
| 3,952,621 A | 4/1976 | Chambos |
| 4,137,839 A | 2/1979 | Couture et al. |
| 4,287,820 A | 9/1981 | Urban |
| 4,581,990 A | 4/1986 | Matsumoto |
| 4,619,192 A | 10/1986 | Cycyk et al. |
| 4,628,808 A | 12/1986 | Simon |
| 4,704,959 A | 11/1987 | Scallen |
| 4,741,265 A | 5/1988 | Cushman |
| 4,753,159 A | 6/1988 | Eaton |
| 4,765,234 A | 8/1988 | Cailliot |
| 5,138,940 A | 8/1992 | Geissler et al. |
| 5,558,011 A | 9/1996 | Heim |
| 5,690,022 A | 11/1997 | Chai |
| RE36,155 E | 3/1999 | Scallen |
| 5,950,528 A | 9/1999 | Wang |
| 5,957,045 A | 9/1999 | He et al. |
| 6,053,098 A | 4/2000 | Yamamoto |
| 6,082,253 A | 7/2000 | Ridler |
| 6,125,744 A | 10/2000 | Martin |
| 6,269,740 B2 | 8/2001 | Kojs |
| 6,327,971 B1 | 12/2001 | Ridler |
| 6,408,520 B1 | 6/2002 | Ridler |
| 6,412,177 B1 | 7/2002 | Ridler |
| 6,523,464 B1 | 2/2003 | Widelo |
| 9,167,938 B2 | 10/2015 | Benoit et al. |
| 10,820,735 B2 | 11/2020 | Benoit et al. |
| 2012/0090480 A1 | 4/2012 | Caspar et al. |
| 2016/0255982 A1 | 9/2016 | Benoit et al. |
| 2021/0000281 A1 | 1/2021 | Benoit et al. |

MODULAR FOOD PROCESSING AND PREPARATION DEVICE

CROSS-REFERENCE TO RELATED APPLICATIONS

This application is a continuation and claims priority to U.S. patent application Ser. No. 17/026,687, now U.S. Pat. No. 11,406,214, filed on Sep. 21, 2020, which is a continuation of and claims priority to U.S. patent application Ser. No. 14/983,735, now U.S. Pat. No. 10,820,735, filed on Dec. 30, 2015, which claims the benefit of U.S. Provisional Patent Application No. 62/128,848, filed on Mar. 5, 2015, all of which are entitled "MODULAR FOOD PROCESSING AND PREPARATION DEVICE." The entire disclosures of each are hereby incorporated herein by reference in their entirety.

TECHNOLOGICAL FIELD

The present disclosure relates generally to a food processing and preparation device. In particular, the device is an attachment for a mixer or similar appliance that peels, slices or shreds, and cores a food product.

BACKGROUND

Various types of food processing devices in the form of combination peelers and slicers have been developed to allow for easier and more uniform slicing and peeling of various food items. Such devices have typically also incorporated coring functionality, facilitating the use therewith in connection with cored fruit, such as apples and the like. Many of such devices are hand-operated, including a crank to drive a screw that advances the food item, mounted on a retaining device on the end of the screw, while rotating it. When the food item contacts the corer and associated peeling and slicing blades, the food item engages these features, and is peeled, cored, and sliced, simultaneously, by further turning of the crank. Powered variations of such devices are often similarly configured, advancing the food item on an unanchored end of a drive screw toward fixed cutting implements. Both forms of such devices can limit the size and weight of items to-be processed due to eccentricity of the advancing screw end created by sagging thereof under heavy weight. Further, such devices can require lengthy time in retracting the core from the corer after processing and in advancing a new food item into contact with the processing implements. Accordingly, further advances may be desirable.

SUMMARY

According to an aspect of the disclosure, a food processing device includes a gear housing, a frame arm extending from the gear housing on a first lateral side thereof, and a drive screw extending between and operably coupled on respective ends thereof with the gear housing and a support end of the frame arm. The device further includes a retention hub operably coupled with the gear housing and extending generally parallel with and adjacent a portion of drive screw and an input hub extending from the gear housing opposite the drive screw and the retention hub and operably engaged with both the drive screw and the retention hub to drive synchronized rotational movement thereof with respect to the gear housing. A carrier is slidably coupled with the frame arm and is further operably engaged with the drive screw such that the rotational movement thereof drives corresponding linear movement of the carrier along the frame arm. The carrier defines at least one cutting implement thereon.

According to another aspect of the disclosure, a food processing system includes a stand-based mixing device including an internal motor and a drive port defining an axis and having an output coupling driven by the internal motor. The system also includes a processing attachment having a gear housing with a drive mechanism, an input hub extending from the gear housing and removeably engaging with the drive port in a fixed rotational position about the axis and coupling the drive mechanism with the output coupling, a frame arm extending from the gear housing on a first lateral side thereof to a support end and a drive screw extending between and operably coupled on respective ends thereof with the gear housing and the support end of the frame arm. The system also includes a retention hub releasably operably coupled with the gear housing and extending generally parallel with and adjacent a portion of a drive screw and a carrier slidably coupled with the frame arm and operably engaged with the drive screw. The system further includes a first cutting implement removeably engaged with the carrier. The drive mechanism of the gear housing operably engages the output coupling with both the drive screw and the retention hub to drive synchronized rotational movement thereof with respect to the gear housing such that the rotational movement thereof drives corresponding linear movement of the carrier along the frame arm.

According to another aspect of the disclosure, a kit includes a food processing base unit having a gear housing, a frame arm extending from the gear housing on a first lateral side thereof, a drive screw extending between and operably coupled on respective ends thereof with the gear housing and a support end of the frame arm, a retention fitting extending from the gear housing and rotatable about an axis that extends generally parallel with and adjacent a portion of the drive screw. The food processing base unit also has an input hub extending from the gear housing opposite the drive screw and the retention fitting and operably engaged with both the drive screw and the retention hub to drive synchronized rotational movement thereof with respect to the gear housing and a carrier slidably coupled with the frame arm and operably engaged with the drive screw such that the rotational movement thereof drives corresponding linear movement of the carrier along the frame arm. The kit further includes a first cutting implement removably coupleable with the carrier and a first retention hub selectively coupleable with the retention fitting.

According to another aspect of the disclosure, a food processing device includes a gear housing, a frame arm extending from the gear housing on a first lateral side thereof to a support end, a drive screw extending between and operably coupled on respective ends thereof with a first face of the gear housing and the support end of the frame arm, and a retention hub operably coupled with the gear housing and extending generally parallel with and adjacent a portion of drive screw. The drive screw and the retention hub are linearly arranged with respect to the frame arm in sequential positions away from the first lateral side of the gear housing. The device further includes an input hub extending from a second face of the gear housing opposite the first face and operably engaged with both the drive screw and the retention hub to drive synchronized rotational movement thereof with respect to the gear housing and a carrier slidably coupled with the frame arm and operably engageable with the drive screw such that the rotational movement thereof drives corresponding linear movement of the carrier along the frame arm. The carrier defines at least one cutting implement thereon.

According to another aspect of the disclosure, a food processing device includes a gear housing, a frame arm extending from the gear housing on a first lateral side thereof to a support end, a drive screw extending between and operably coupled on respective ends thereof with a first face of the gear housing and the support end of the frame arm, a retention hub operably coupled with the gear housing and extending generally parallel with and adjacent a portion of drive screw, and an input hub extending from a second face of the gear housing opposite the first face and operably engaged with both the drive screw and the retention hub to drive synchronized rotational movement thereof with respect to the gear housing. The input hub is configured for attachment with a drive port of a motor driven device such that the device can drive rotation of the input hub and to support the food processing device with respect to the motor driven device such that the retention hub, the drive screw, and the frame arm are laterally arranged with respect to each other. The device further includes a carrier slidably coupled with the frame arm and operably engageable with the drive screw such that the rotational movement thereof drives corresponding linear movement of the carrier along the frame arm. The carrier defines at least one cutting implement thereon.

According to another aspect of the disclosure, a food processing device includes a body defining a gear housing and a frame arm extending from the gear housing on a first lateral side thereof to a support end, a drive screw extending between and operably coupled on respective ends thereof with a first face of the gear housing and the support end of the frame arm, a retention hub operably coupled with the gear housing and extending generally parallel with and adjacent a portion of drive screw, and a carrier slidably coupled with the frame arm and selectively operably engageable with the drive screw such that the rotational movement thereof drives corresponding linear movement of the carrier along the frame arm. The carrier includes a body having a cavity therein defining a cutting implement receptacle on an upper vertical side of the body. The device further includes a cutting implement including a base removably engageable in the cutting implement receptacle by way of one of a snap fit or press fit therebetween with the cutting implement extending over the drive screw to at least partially align with the retention hub.

According to another aspect of the disclosure, a food processing system includes a food processing base unit having a gear housing, a frame arm extending from the gear housing on a first lateral side thereof, a drive screw extending between and operably coupled on respective ends thereof with the gear housing and a support end of the frame arm, and a retention fitting extending from the gear housing and rotatable about an axis that extends generally parallel with and adjacent a portion of the drive screw. The food processing base unit also has an input hub extending from the gear housing opposite the drive screw and the retention fitting and operably engaged with both the drive screw and the retention hub to drive synchronized rotational movement thereof with respect to the gear housing and a carrier slidably coupled with the frame arm and operably engaged with the drive screw such that the rotational movement thereof drives corresponding linear movement of the carrier along the frame arm. The system further includes a first cutting implement and a second cutting implement, each being alternately coupleable with the carrier.

These and other features, advantages, and objects of the present device will be further understood and appreciated by those skilled in the art upon studying the following specification, claims, and appended drawings.

DETAILED DESCRIPTION OF EMBODIMENTS

Figure 1:
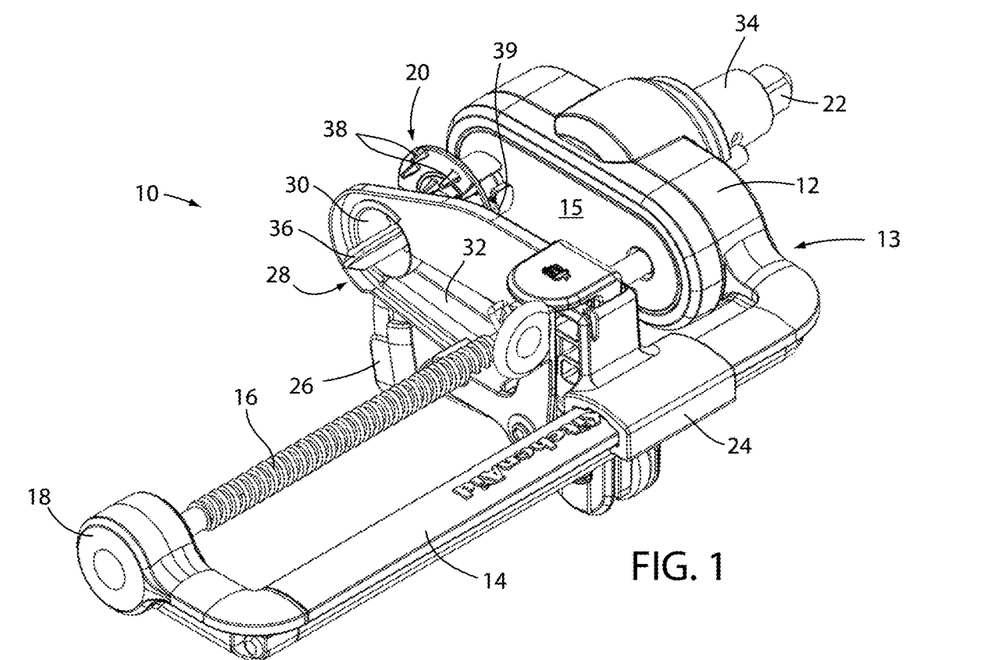
FIG. 1 is a top-back perspective view of a food processing and preparation device.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
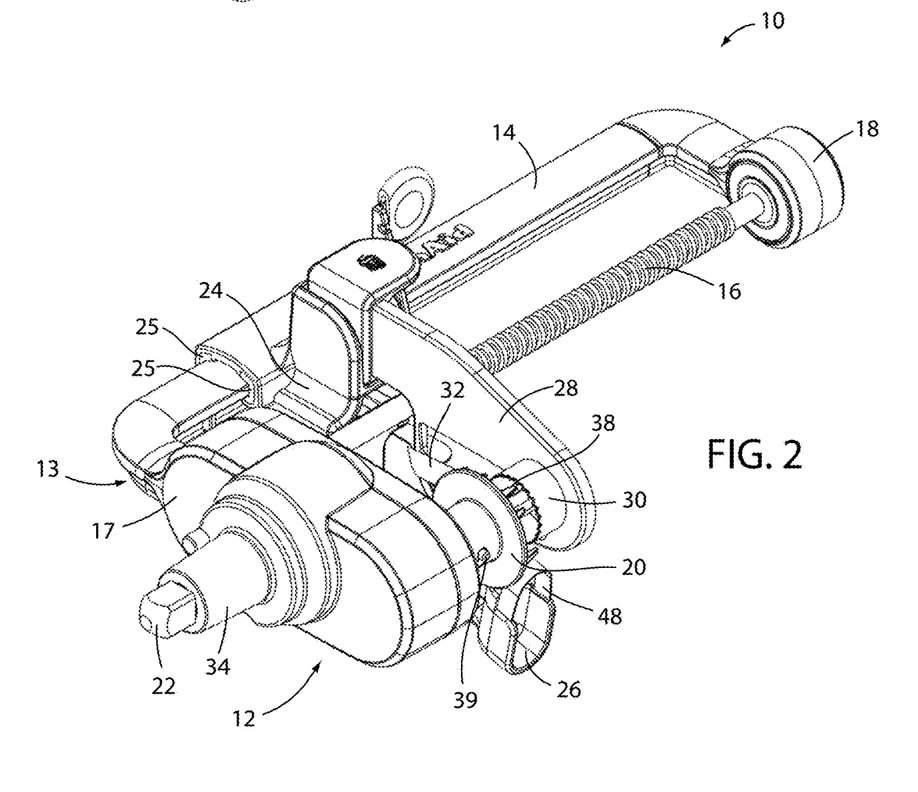
FIG. 2 is a top-front perspective view of the food processing and preparation device of FIG. 1.

Referring to FIGS. 1 and 2, reference numeral 10 generally refers to a precision food preparation and processing device (hereinafter referred to as a processing device 10) that is capable of paring, coring, and spiral slicing or shredding a variety of food products, such as, but not limited to, those described further below. Device, 10 includes a gear housing 12 with a frame arm 14 extending therefrom on a first lateral side 13 of the gear housing 12. A drive screw 16 extends between and is coupled on respective ends with a first face 15 of gear housing 12 and a support end 18 of frame arm 14. A retention hub 20 is operably coupled with gear housing and extends parallel with a portion of drive screw 16. The drive screw 16 and the retention hub 20 are linearly arranged with respect to the frame arm 14 to sequential positions away from the first lateral side 13 of the gear housing 12. An input hub 22 extends from a second face 15 of gear housing 12 opposite the first face 15 and is operably engaged therewith to drive synchronized rotational movement thereof with respect to gear housing 12. A carrier 24 is slidably coupled with frame arm 14 and has a coupling unit extending therefrom to engage with the drive screw 16 such that the rotational movement thereof drives linear movement of the carrier 24 along the frame arm 14. Carrier 24 has operably coupled therewith a peeling arm 26 and a cutting implement 28 that, in an embodiment can include both an annular coring blade 30 and a straight slicing blade 32 that are positioned on carrier to simultaneously implement peeling, slicing, and coring actions on a product retained on retention hub 20 during synchronized rotational movement of drive screw 16 and retention hub 20.

It is noted that frame arm 14, and gear housing 12 can be arranged in a single unit and can be made of a common material, including plastic, metal, or the like. In one embodiment, at least portions of frame arm 14 and gear housing 12 can be made of cast aluminum, which may give device 10 adequate strength to reliably cut even dense foods. Similarly a portion of carrier 24 can also be made of cast aluminum. To facilitate reliable sliding of carrier 24 along frame arm 14, one or more inserts 25 can be assembled into carrier 24 along portions thereof that contact frame arm 14. Such inserts can be of plastic, nylon, or the like and can include a coating (e.g. of Teflon™ or the like) to reduce friction between carrier 24 and frame arm 14. Further, inserts 25 can compensate for draft within carrier 24, allowing for a more secure fit along frame arm 14.

Figure 3:
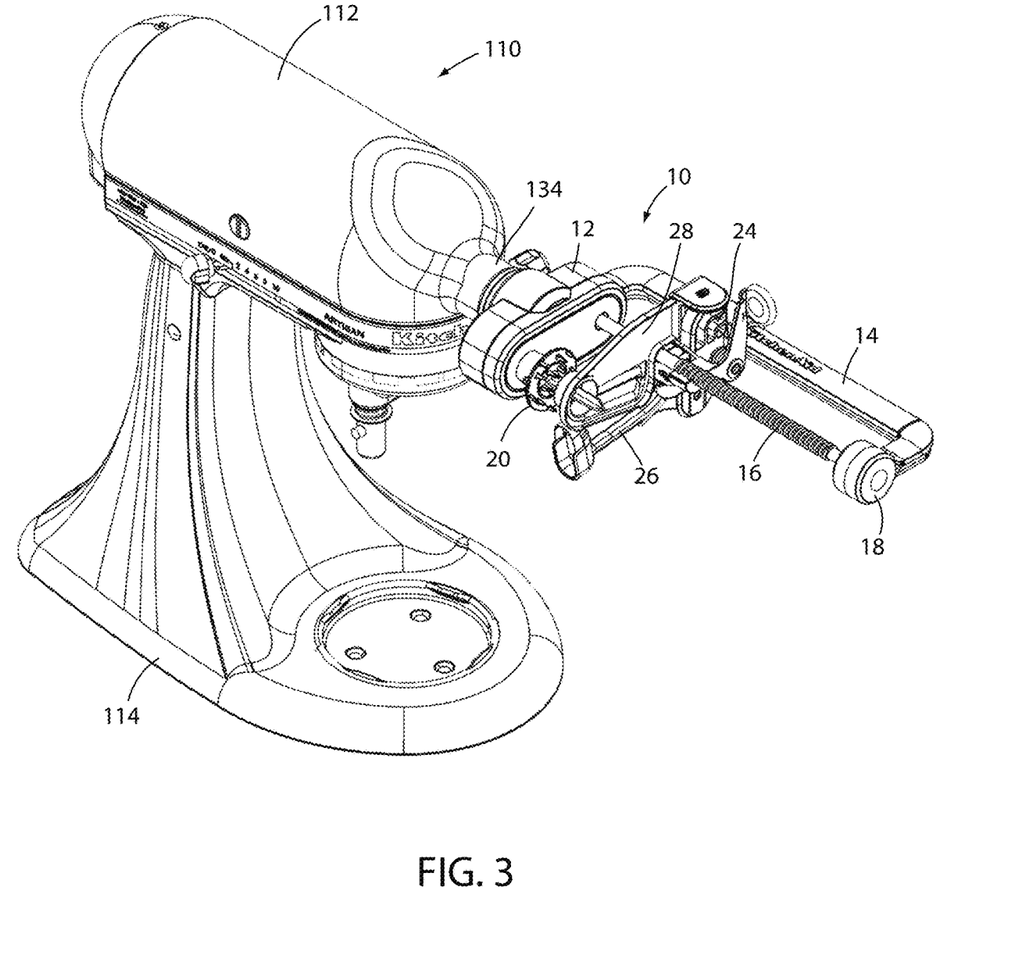
FIG. 3 is a perspective view of the food processing and preparation device of FIG. 1 assembled with a motor driven device.
Figure 4:
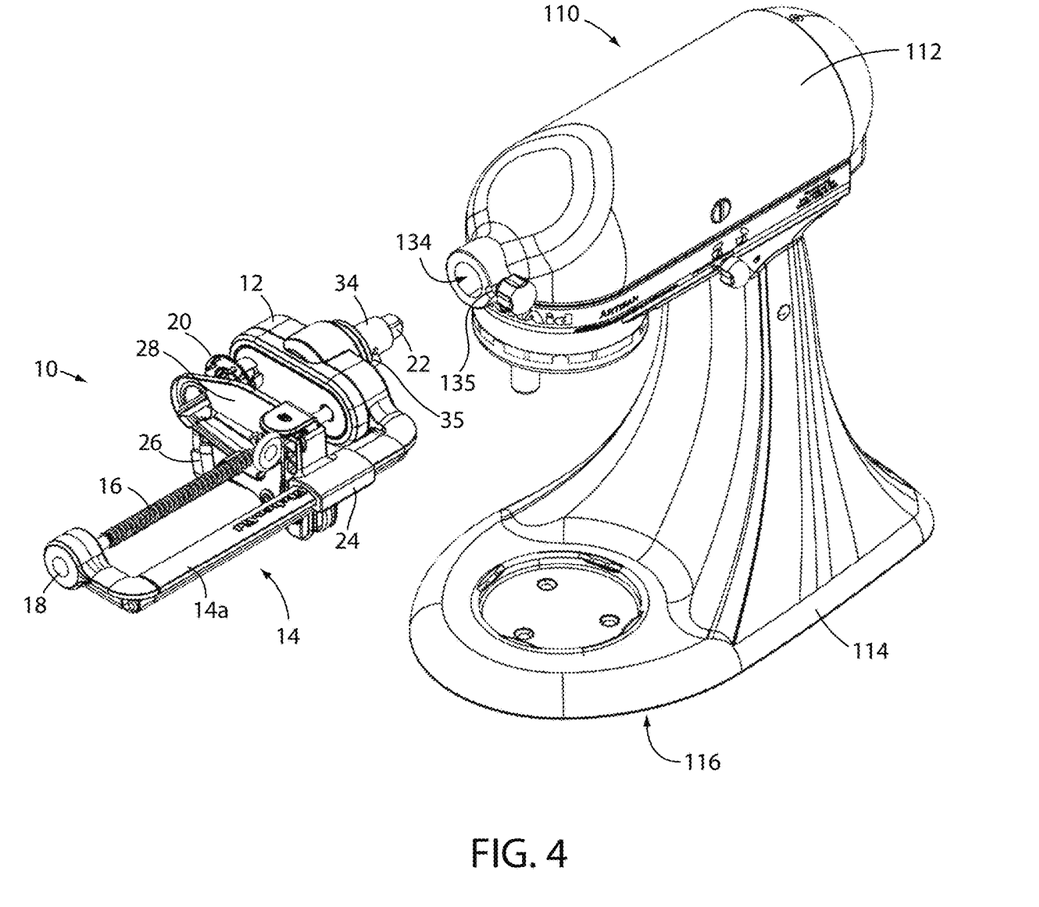
FIG. 4 is an exploded perspective view of the food processing and preparation device and mixing device of FIG. 3.

The processing device 10, as shown in FIGS. 1 and 2, further includes a coupling extension 34 (also referred to as an input hub), which is adapted to attach to a drive port 134 of a drive unit, which in an example, may be in the form of a mixer or, more specifically, a stand-based mixer (or "stand mixer") 110, as shown in FIGS. 3 and 4. The particular example of a mixer 110 includes an upper arm in the form of motor housing 112 and a stand or base portion 114. The stand or base portion 114 is weighted, such that the mixer 110 can support the processing device 10 as coupled to the upper motor housing 112 by way of drive port 134. The processing device 10 couples to drive port 134, which may be disposed on a front end of the motor housing 112 of the mixer 110. When the processing device 10 is coupled to the mixer 110, the motor housed in the motor housing 112 of the mixer 110 is adapted to translate power to a drive belt or gearing mechanism, disposed in the gear housing 12, to provide power to the processing device 10 to drive the aforementioned synchronized rotational motion of the drive shaft 16 and the retention hub 20.

Figure 6:
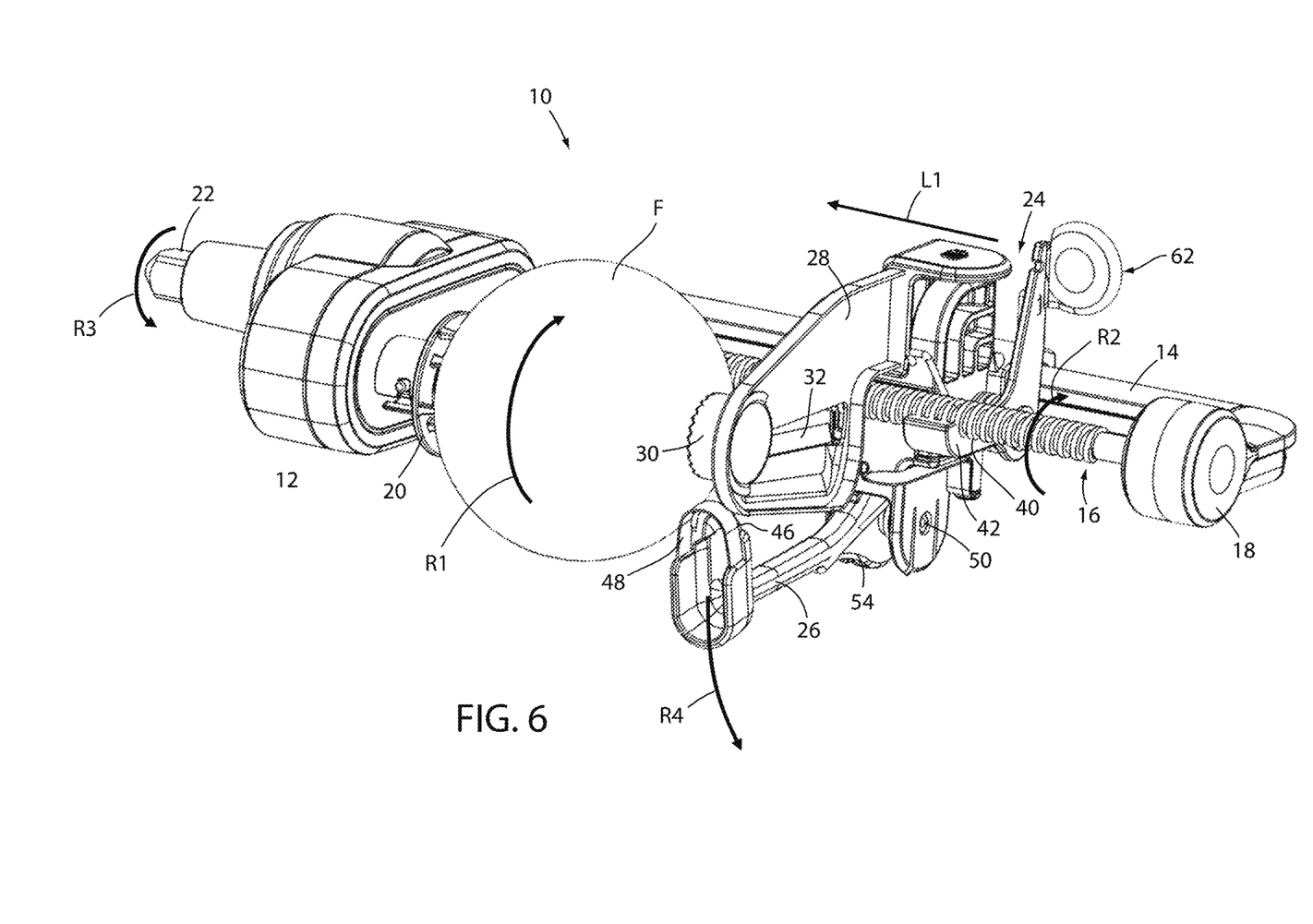
FIG. 6 is the food processing and preparation device of FIG. 5 shown during an initial stage of acting on the food product.
Figure 7:
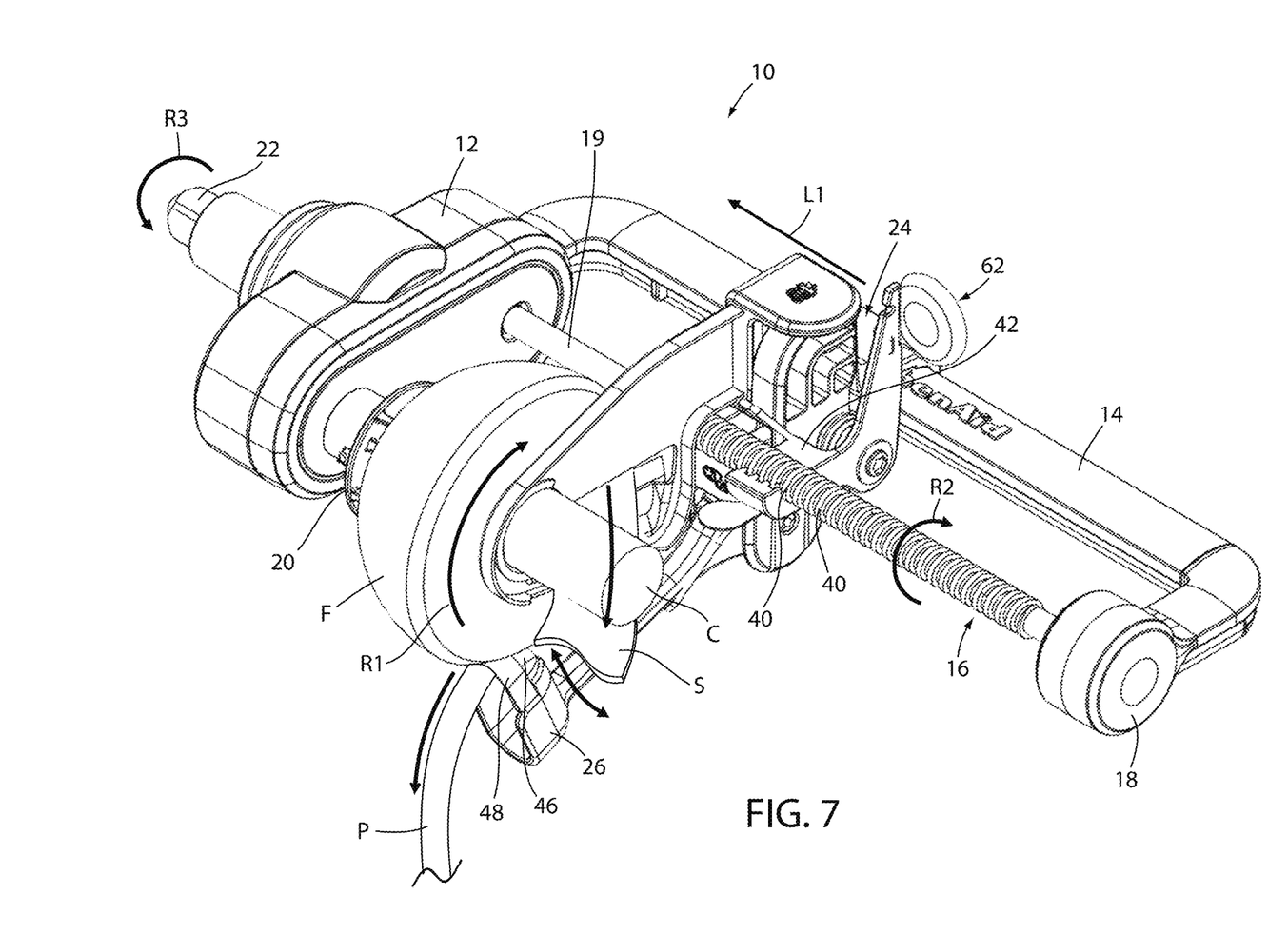
FIG. 7 is the food processing and preparation device of FIG. 5 shown during a further stage of acting on the food product.

In particular, the gear housing 12 is adapted (by internal gearing, for example) to drive retention hub 20 and drive screw 16, by the power of the stand mixer 110 (FIGS. 3 and 4), in directions R1 and R2, as shown in FIGS. 6 and 7 and as discussed further below. Further, as shown in FIGS. 3 and 4, coupling extension 34 is adapted, such as by shape or the positioning of various, interlocking features, to be retained with mixer 110 by way of drive port 134 such that retention hub 20, drive screw 16 and frame arm 14 are horizontally arranged. In the illustrated example, the gear housing 12 can include a key 35 adjacent the coupling extension 34 and receivable within a keyhole 135 adjacent drive port 134 such that, device 10 is assemblable with mixer 110 in a fixed rotational position about an axis defined by drive port 134 with respect to mixer 110. In this manner, frame arm 14, or at least an extension portion 14A thereof, and drive screw 16 are generally equidistant from a lower surface 116 of base 114. As will be apparent from the discussion below, such an arrangement may allow for easier collection of the processed food over, for example, an arrangement with frame arm 14 or a similar structure positioned beneath drive screw 16, which may interfere with falling portions of the processed food.

Figure 5:
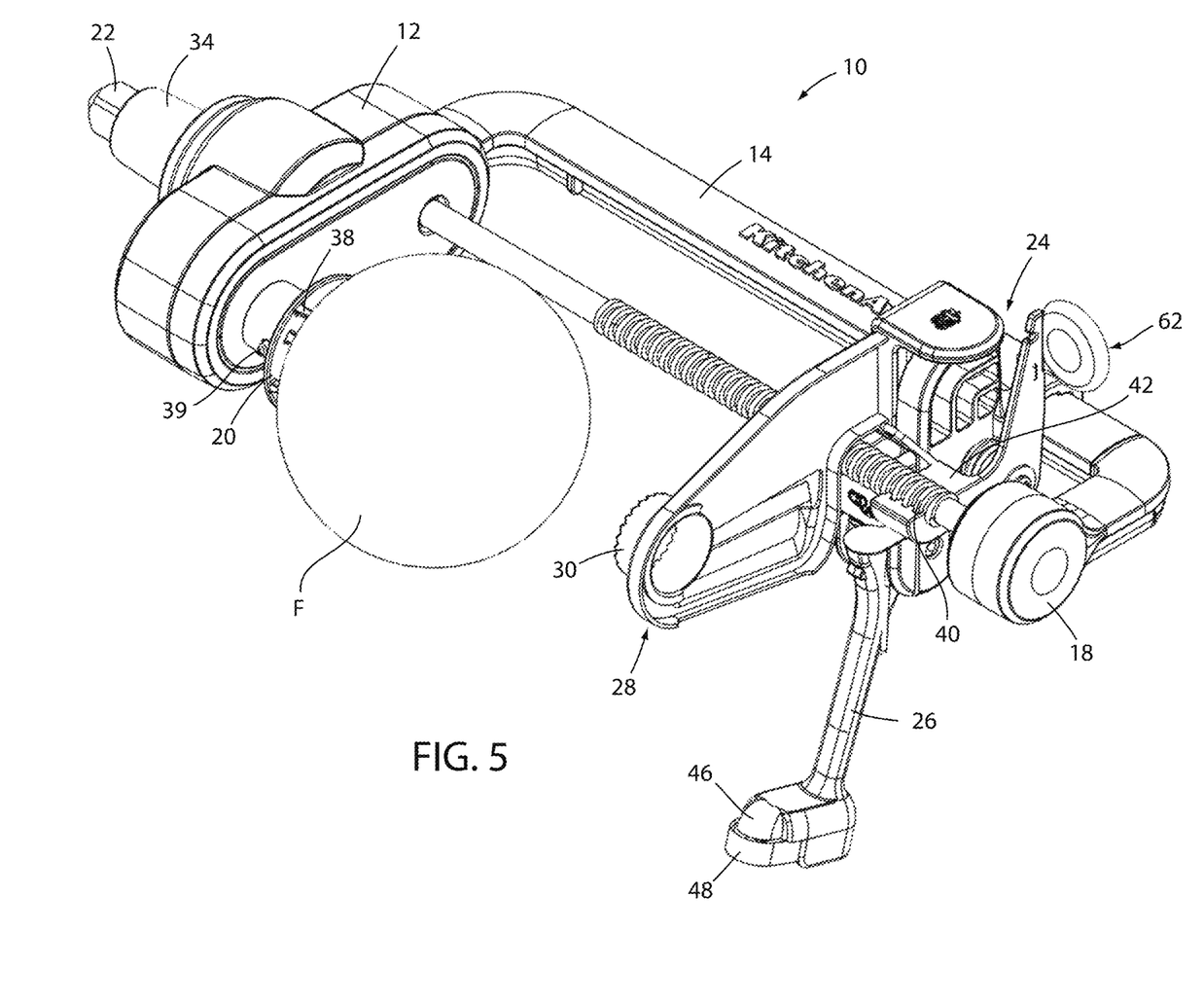
FIG. 5 is a perspective view of the food processing and preparation device of FIG. 1 with a food product retained thereon.

With reference to FIGS. 5-7, particular aspects of such horizontal arrangement and other features of device 10 are described with respect to the device 10 in use to process an article of food F, which may be an apple, potato, melon, or the like. It is noted that device 10 is shown detached from mixer 110 in FIGS. 5-7 for the purpose of clarity when illustrating various aspects thereof, but that the actions described herein may be generally carried out with device 10 assembled with mixer 110 in the manner described above with respect to FIGS. 3 and 4. It is further noted however, that other appliances or articles may be adapted to drive the actions of device 10 described herein and may be adapted to attach therewith in similar manners.

As can be seen in FIG. 5, device 10 can be prepared with a food article F for processing thereof by mounting food particle F onto retention hub 20, which can be done by puncturing food article F with food skewer 36 such that food skewer extends into food article F and, further, such that spikes 38 at least contact a portion of food article F, with at least some spikes 38 themselves puncturing portions of food article F. The mounting of food article F onto retention hub 20 can be done while retention hub 20 is assembled with device 10 or, alternatively, retention hub 20 can be removable form device 10, such as by way of a bayonet fitting 39, such that retention hub 20 can be assembled with food article F, and such an assembly can be subsequently coupled with device 10. As further shown in FIG. 5, carrier 24 can be positioned in a location along frame arm 14 such that cutting implement 28 and peeling arm 26 are at a distance away from retention hub 20 sufficient to accept food article F therebetween. Accordingly, supporting end 18 of frame arm 14 may be positioned away from gear housing 12 by a distance large enough to allow carrier 24 to be moved adjacent to supporting end 18 of frame arm 14 to accept relatively large food articles F (such as melons or the like) within device 10.

After initial assembly of food article F onto retention hub 20, carrier 24 can be moved in direction L1 such that a portion of cutting implement 28, peeling arm 26, or both are brought into contact with food article F. In the example shown in FIG. 6, such contact can be achieved between coring blade 30 and a leading edge of food article F. This contact may further serve to help retain a desired position of food article F with respect to retention hub 20 prior to the initiation of a cutting motion thereof using device, as described further below. Further, this contact between cutting implement 24 and food article F can be achieved by activating mixer (or another driving implement for device 10) such that drive screw 16 rotates in direction R2, thereby causing lateral movement of carrier 24 in direction L1 until such movement of carrier 24 is through an adequate distance to bring cutting implement 28 into contact with food article F. Alternatively, and as described further below, carrier 24 may be temporarily disengaged from screw 16 such that carrier 24 can be freely slid along frame arm 14, thereby allowing a user to manually slide carrier 24 to such location that cutting implement contacts food article F, such as by coring blade 30, at which point carrier 24 may be re-engaged with drive screw 16, thereby retaining the user-selected position of carrier, such as shown in FIG. 6.

In an example where the positioning shown in FIG. 6 is achieved by activation of device 10, device 10 may be left in such an activated condition (i.e. by leaving the mixer 110 with which device 10 is assembled in an ON position) to allowing processing of food article F by device 10 to begin by continued motion of carrier 24 along direction L1, as driven by rotational motion of screw in direction R2, along with synchronized rotation of food article F in direction R1 by attention hub 20. Alternatively, device 10 may be deactivated in such a time to allow a user to inspect the condition of device 10 and food article F so that proper operation can be ensured. In a further alternative example where the user has manually moved the device 10 into the position of FIG. 6, proper positioning of food article F can be inspected prior to activation of device 10.

When a processing operation of food article F by device 10 begins, the above-described rotational motions of rotational motions of rotation hub 20 in direction R1, drive screw 16 in direction R2, as driven by rotation of input hub 22 in direction R3 by coupling thereof with mixer 110 continues to effect such processing.

In particular, as the drive screw 16 rotates, threads 40 thereof, which themselves are engaged with to coupling arm 42 by way of thread portions 44 thereon that mesh with threads 40 of drive screw 16, carrier 24 is driven in lateral movement in a linear direction L1 along frame arm 14, as shown in FIG. 6. Such linear motion moves cutting implement 28 and peeling arm 26 into food article F, in a manner such that a cutting engagement of coring blade 30 with and into a leading edge of food article F and, further, of peeling blade 48 with food article F, as food article F is rotated by retention hub 20 in direction R1. As further shown in FIG. 7, the thread 40 of the drive screw extend only partially along the length thereof to define a threaded portion with an unthreaded portion 19 laterally aligning with at least a portion of the retention hub 20.

Figure 8:
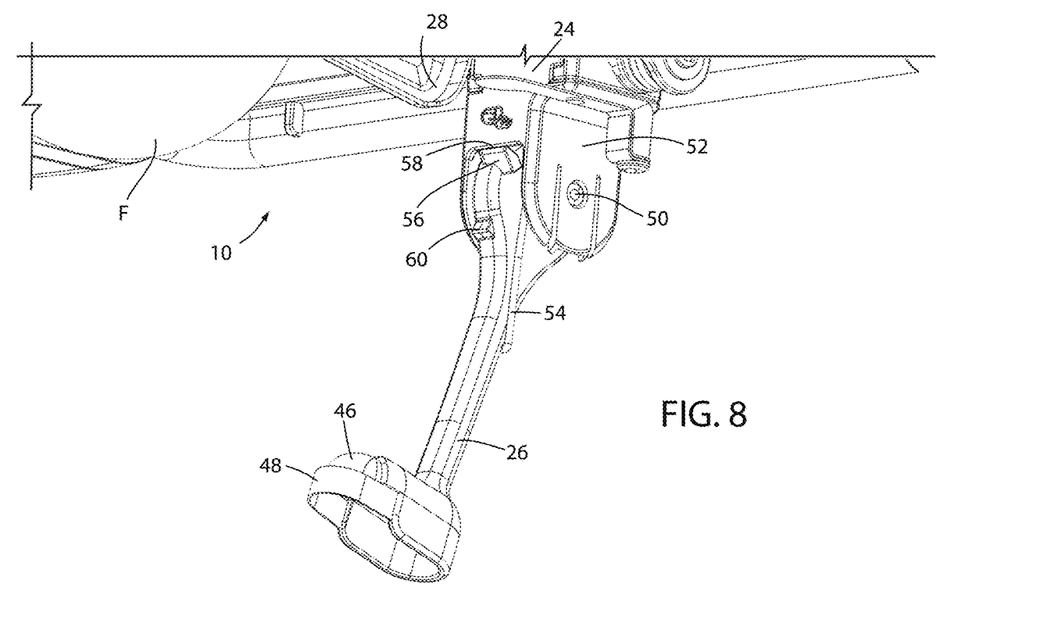
FIG. 8 is a detail view of a peeling arm of the food processing and preparation device of FIG. 1 in an open position.
Figure 9:
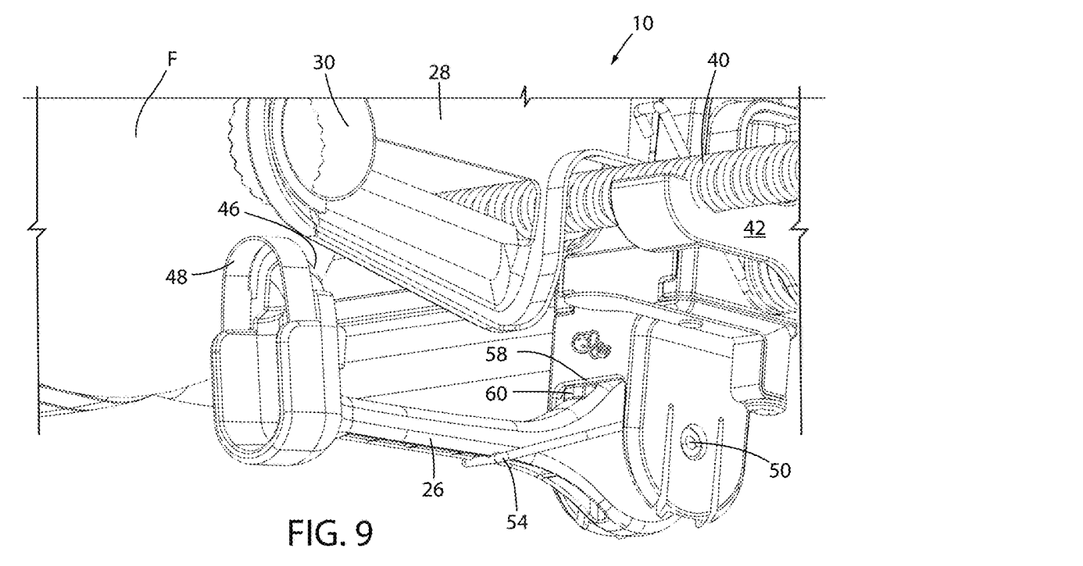
FIG. 9 is a further detail view of the peeling arm in a closed position.

As further shown in FIGS. 5-7, as well as in FIGS. 8 and 9, the peeling arm 26 as a whole pivots about a coupling point 50 (FIG. 9) thereof with a base block 52 so as to rotate in a direction R4 toward and away from food article F. It is noted that base block 52 may be integral with the remainder of carrier 24 or may be removable from the lower vertical side 35 of carrier 24 (such as by a sliding engagement that may be secured by an internal locking mechanism releasable using lever 62, as shown in FIGS. 5-7, for example). In particular, peeling arm 26 is adapted to be biased towards the food article F (such as by spring 54) to peel the food item F as the carrier 24 moves along the frame arm 14, as powered by the drive screw 16, thereby separating a length of peel P from food article F in a generally continuous strip, as shown in FIG. 7 (subject to occasional breakage of the peel P by gravity, etc.). Blocking surface 46 of peeling arm is positioned to contact food article F ahead of peeling blade 48 such that the depth of the peeling cut thereby achieved is maintained without removing an undesirable amount of the flesh of food article F.

With reference to FIG. 7, as the processing of food article F by device 10 continues, including the aforementioned rotation of food article F in synchronized linear motion of carrier 24 in direction R1, food article F is brought into contact with slicing blade 32 of cutting implement 28. As food article F moves into and over slicing blade 32, a depth-wise slice S of food article is removed therefrom by slicing blade 32. In general, a thickness of slice S is achieved by the amount of movement of carrier 24 in direction L1 per revolution of food article in direction R1, which may be influenced by a gear ratio within gear housing 20 of the various belts and gears that are used to synchronize the rotation of drive screw 16 and retention hub 20, as well as the thread pitch of the threads 40 of drive screw 16.

As can also be seen in FIG. 7, continued processing in food article F by device 10 results in simultaneous cutting of food article F by coring blade 30 such that core C of food article F remains in a fixed relationship with retention hub 20 and any unprocessed portions of food article F, while slice S is removed therefrom food article F in a spiral or curling shape that may be continuous or that may periodically break or otherwise sever during processing. Such continued processing of food article F further causes separation peel P, as described above, prior to the slicing of food article F by slicing blade 32, such that the peel or other outer layer of food article F is not present on slice S. Such processing can be allowed to continue until both peel P and slice S have been separated from core C and no, or minimal, unprocessed portions of food article F remain. At such a point, core C and any remaining unprocessed portions of food article F can be removed from retention hub 20, such as by pulling on core C in a direction opposite direction L1, or by moving carrier 24 in the direction opposite L1, such as by disengaging carrier 24 from drive screw 16 to allow manual reversing of carrier 24. In an embodiment where reversing the driving direction of mixer 110 is possible, such action can also be used to withdraw carrier 24 from the remaining unprocessed food article F. Subsequently, additional food articles may be processed in a similar manner.

It is noted that the food article F rotates with retention hub 20, yet remains stationary in place (such as in lateral direction L1) as does retention hub 20, as the traversing carrier 24 moves laterally along the frame arm 14. The stationary yet rotary configuration of the food item 51 also allows for the processing device 10 to process larger food items which are not easily moved laterally on conventionally known paring/coring devices.

It is further noted that the horizontal arrangement of frame arm 14, drive screw 16 and retention hub 20 allows peeled P (FIG. 7) and sliced S (FIG. 7) portions of the food product F (FIG. 7) processed using device 10 to fall, under force of gravity, downward and away from peeling arm 26 and cutting implement 28, which may help a user retain, in particular, the sliced portions S (such as in a bowl placed beneath device 10) without such portions being caught on drive screw 16 or frame arm 14. The horizontal orientation just described also prevents the peeled portions P, sliced portions S, or other debris or the like from being retained on drive screw 16 or frame arm 14 and interfering with the movement of carrier 24 therealong.

As shown in FIGS. 8 and 9, peeling blade 48 can include a positioning device in the form of a detent flange 56 extending therefrom in a radial position with respect to attachment 50 of peeling arm 26 with base block 52 such that detent 56 can engage with an edge 58 of base block 52 to allow peeling arm 26 to be retained in an open position, as shown in FIG. 8. In particular, detent flange 56 can be at least somewhat resiliently deformable so as to be able to deflect to pass over edge 58 while peeling arm 26 is being moved either toward the open position (FIG. 8) or away therefrom (i.e. toward the biased position shown in FIG. 9). Such movement can be carried out by a user of device 10 such as by manually moving peeling arm 26 away from the biased position in FIG. 9, against the force of spring 54 (which provides the biasing of peeling arm 26 into the biased position), such that peeling arm 26 moves into the open position, thereby forcing detent flange 56 over edge 58 into a abutting position with respect thereto so as to retain peeling arm 26 in the open position against the force of spring 54. Such positioning may allow for clearance of the assembly of the food article F with device 10 and/or positioning of cutting implement 28 in contact with food article F, as shown in FIG. 6, thereby allowing easier set up of food article F and device 10.

After the desired setup of food article F and device 10, as well as desired positioning of cutting implement 28 with respect to food article F, the user can apply a pressure against peeling arm 26 toward the biased position sufficient to force detent flange 56 to deflect and travel over edge 58, thereby releasing peeling arm 26 from the open position, at which point spring 54 will force peeling arm 26 toward the biased position until such a time that blocking surface 46 and/or blade 48 contact food article F or stop surface 60 of peeling arm 26 contacts edge 58. It is noted that stop surface 60 may be positioned relative to peeling arm 26 such that blocking surface 46 and peeling blade 48 remain at a sufficient distance from coring blade 26 to prevent binding thereof against a leading edge of food article F, which may be generally vertical in the area of coring blade 30.

Figure 10:
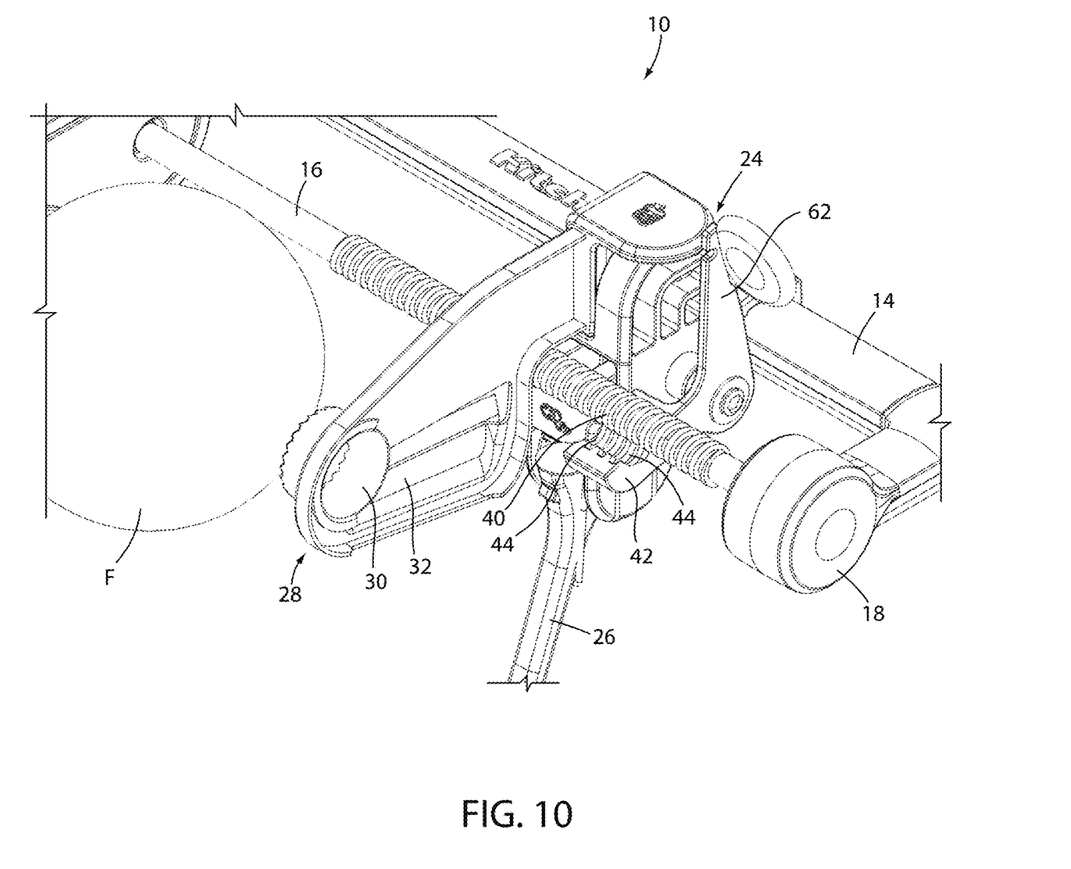
FIG. 10 is a detail view of a coupling arm of the food processing and preparation device of FIG. 1 in a decoupled position.

Turning now to FIG. 10, coupling arm 42 of carrier 24 is shown in a released position from drive screw 16, such that, as described above, carrier 24 is decoupled from drive screw 16, thereby configuring carrier 24 for free movement in and/or against direction L1 along frame arm 14. As shown in FIG. 10, such movement of coupling arm 42 can be achieved by movement of lever 62, such as by a user of device 10, against the force of a biasing spring that may be coupled between coupling arm 42 and remaining portions of carrier 24. As further shown, movement of coupling arm out of engagement with drive screw 16 can be done such that coupling arm 42 moves away from drive screw 16 by a distance sufficient to disengage thread portions 44 from the corresponding threads 40 of drive screw 16. It is further noted that the inclusion of multiple thread portions 44 on coupling arm 42, of which three thread portions 44 are shown in the example of FIG. 10, can help provide a more robust engagement between carrier 24 and drive screw 16, as compared to a single thread engagement. The more robust coupling achieved can allow device 10 to be used to reliably process more dense food articles, such as melons, potatoes, or the like, as drive screw 16 is able to move carrier 24 in direction L1 with the force needed to drive such food articles F over slicing blade 32 and peeling blade 48.

Figure 11:
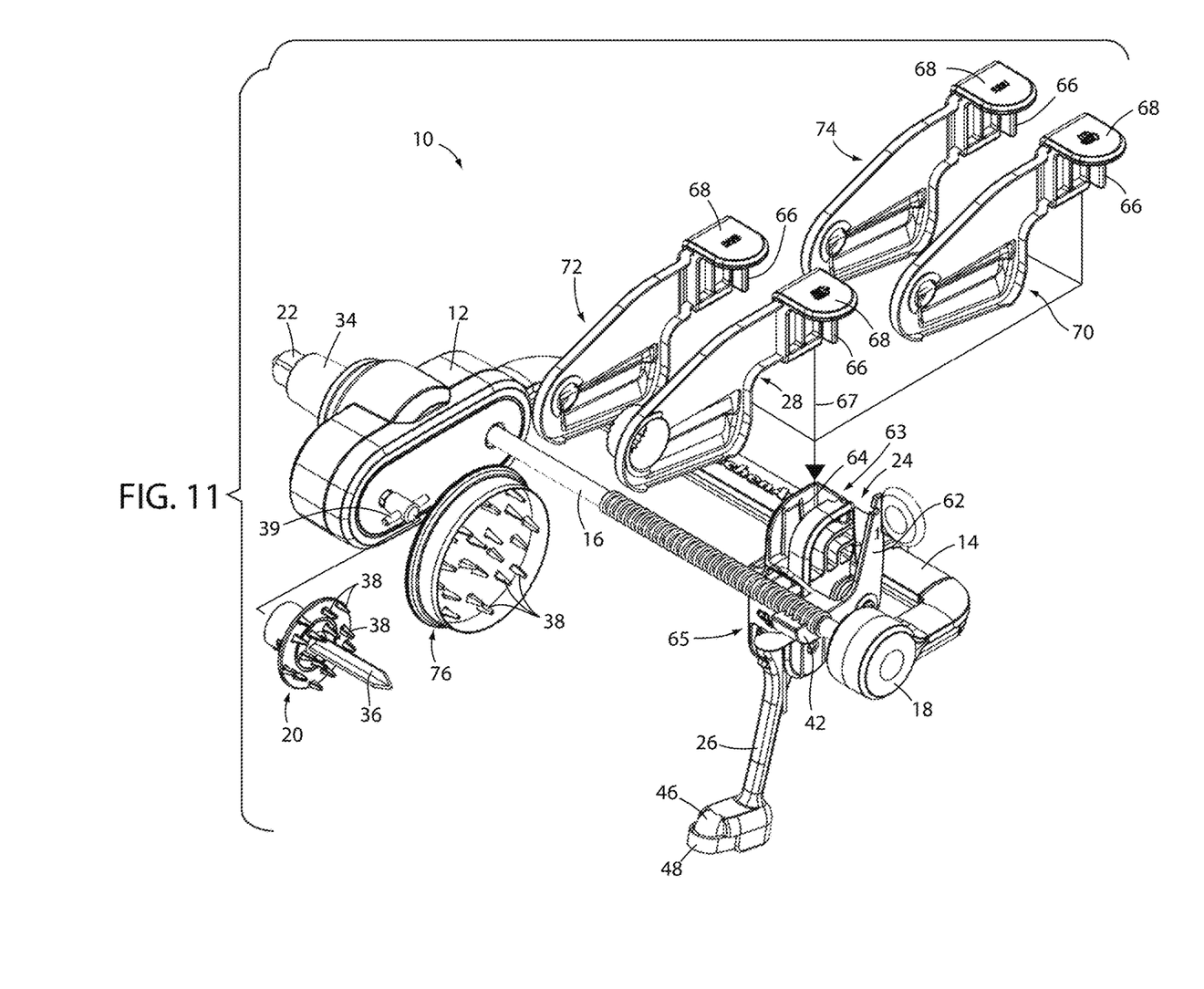
FIG. 11 is an exploded view of the food processing and preparation device of FIG. 1 in an exploded arrangement with additional, modular components thereof.

Turning now to FIG. 11, a modular configuration of device 10 is shown, in which cutting implement 28 is removable from carrier 24. Such removable coupling can, as in the example shown, be achieved by a snap or press-fit between a cutting implement receptacle 64 on an upper vertical side 63 of carrier 24, and a cutting implement base 66 on cutting implement 28. This configuration can be such that a user can either assemble with or remove from carrier 24 cutting implement 28 by appropriate pressure on a lever 68 that extends from base 66 and by movement in the vertical direction 67. As further shown in FIG. 11, such removability of cutting implement 28 from carrier 24 allows a plurality of additional cutting implements 70, 72, and 74 to be assemblable with carrier 24 as an alternative to cutting implement 28. As discussed further below, the various additional cutting implements 70, 72, and 74 can be configured to carry out various, alternative food processing functions.

As further shown in FIG. 11, a multi-pronged food adaptor 76 can be assemblable with bayonet fitting 39 as an alternative to retention hub 20, which, as described above, can be removable from gear housing 12 by way of bayonet fitting 39. As shown, multi-pronged food adaptor 76 can be configured with a plurality of spikes 38, but lacking a food skewer 36, such that spikes 38 can engage with a food article F by way of several small punctures through the skin thereof but not by significant engagement with the flesh of food article F, which, in instances where such flesh is generally soft may only serve to damage food article F without providing additional retention thereof.

Figure 12:
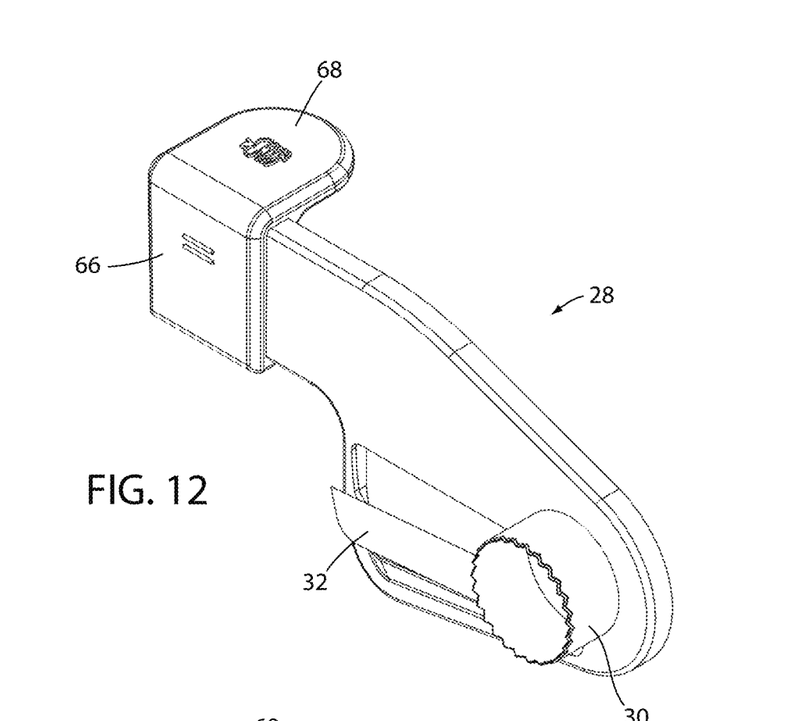
FIG. 12 is a front perspective view of a modular cutting implement useable as a part of the food processing and preparation device of FIG. 1.
Figure 13:
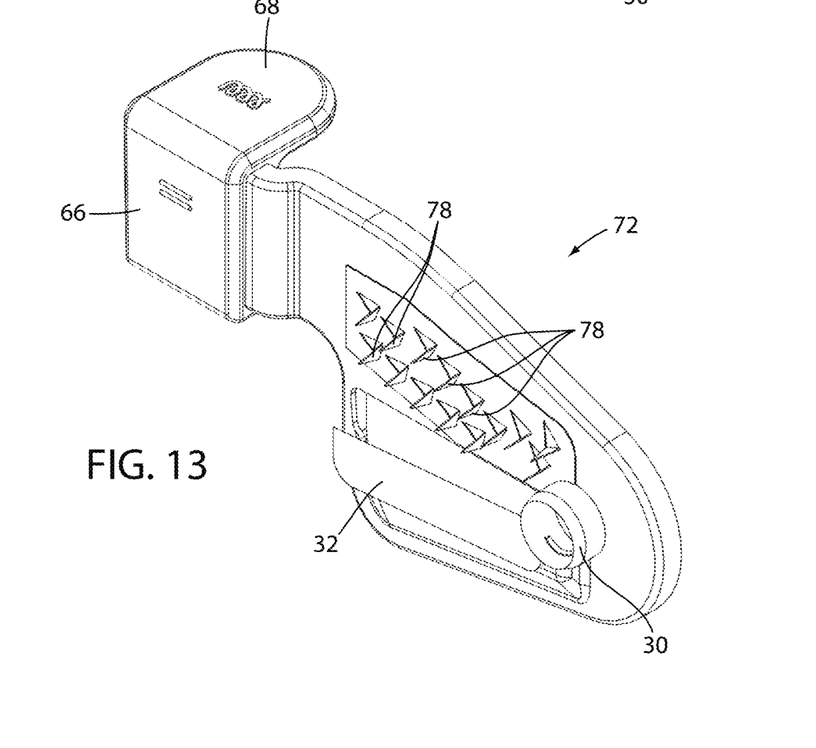
FIG. 13 is a front perspective view of an alternative modular cutting implement useable as a part of the food processing and preparation device of FIG. 1 in an alternative configuration thereof.

Referring now to FIGS. 11, 12 and 13, various types of cutting implements are discussed, including cutting implements 28 and 70 and spiral-shredding implements 72 and 74. Cutting implement 28 is discussed above with respect to FIGS. 5-7 and includes coring blade 30 and slicing blade 32 to simultaneously form slice S (FIG. 7) separated from core C. Cutting implement 70 (shown in FIG. 11) includes a slicing blade 32 similar to cutting implement 28 with a smaller variation of the coring blade 30 of cutting implement 28. Accordingly, cutting implement 70 can be used to peel, core, and slice a food article F with a smaller core or no core (e.g. a potato) compared to cutting implement 28. As shown in FIG. 13 a shredding variation of a cutting implement 72 can be used to spiral cut a food article F while simultaneously cutting food article radially via the series of radial blades 78 and then rotate through to contact the slicing blade 32. In this way, the food article will be sliced in a radial manner by the series of radial blades 78, and then further sliced in depth-wise manner by slicing blade 32 to provide continuous spiral "box cut" shreds of food. A further variation of a shredding cutting implement 74 can have radial blades that are more tightly packed or, alternatively, spaced at a greater distance to provide different thicknesses of shreds compared to cutting implement 72.

Figure 14:
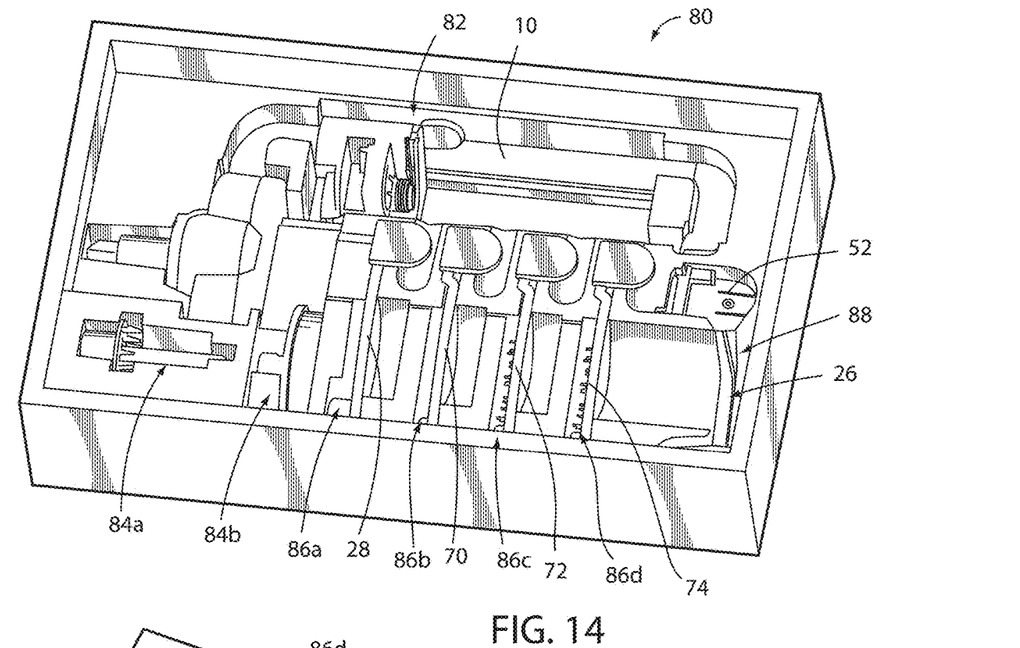
FIG. 14 is a front perspective view of a kit including the food processing and preparation device of FIG. 1 with additional, modular components thereof in packaging therefor.
Figure 15:
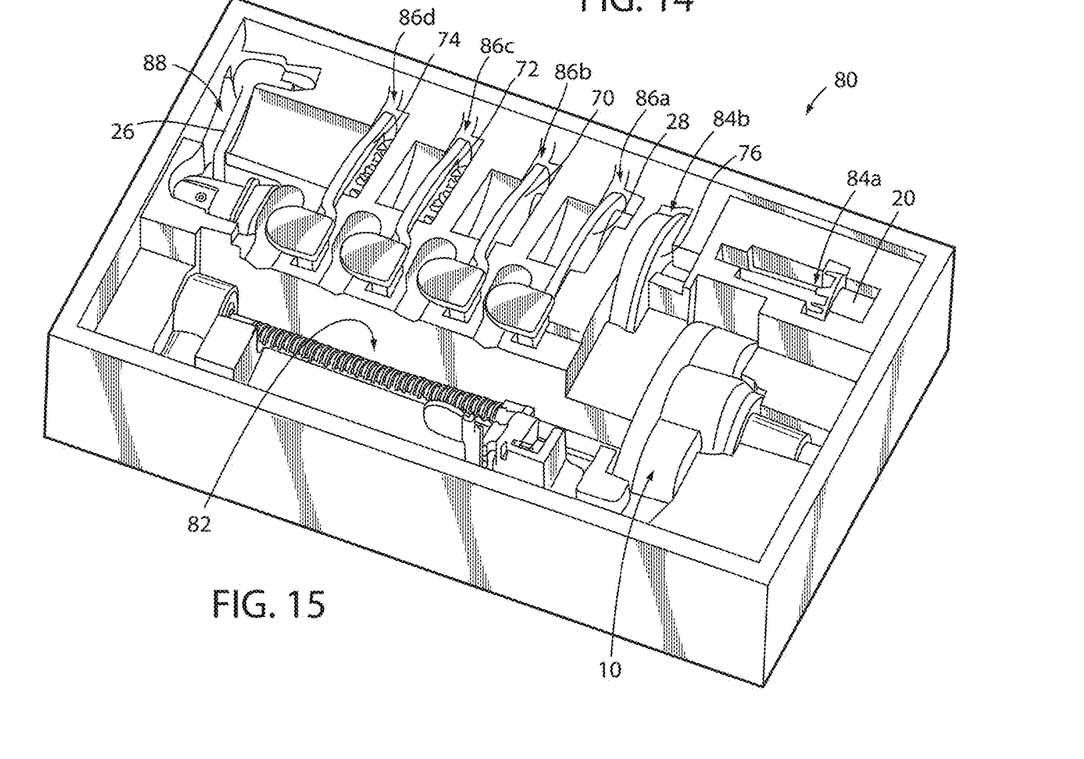
FIG. 15 is a back perspective view of the kit of FIG. 14.

As shown in FIGS. 14 and 15, packaging 80 may be provided with device 10 such that the various components thereof, including the various modular components can be retained therein to serve as a storage article for device 10 when not in use. In particular, packaging 80 can include a device well 82 to retain the portion of device 10 consisting generally of gear housing 12, frame arm 14, carrier 24 and coupling extension 34. Further, package 80 can include a plurality of wells 84a and 84b, for example, sized and positioned to receive the various examples of retention hubs 20, and 76. Still further, package 80 can include a plurality of wells 86a, 86b, 86c, and 86d to respectively receive and retain the various cutting implements 28, 70, 72, and 74, and a further well 88 to receive and retain an assembly of peeler arm 26 and base block 52.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A kit, comprising:
   a food processing base unit, including:
      a gear housing;
      a frame arm extending from the gear housing on a first lateral side thereof;
      a drive screw extending between and operably coupled on respective ends thereof with the gear housing and a support end of the frame arm;
      a retention fitting extending from the gear housing and rotatable about an axis that extends generally parallel with and adjacent a portion of the drive screw;
      an input hub extending from the gear housing opposite the drive screw and the retention fitting and operably engaged with both the drive screw and the retention hub to drive synchronized rotational movement thereof with respect to the gear housing; and
      a carrier slidably coupled with the frame arm and operably engaged with the drive screw such that the rotational movement thereof drives corresponding linear movement of the carrier along the frame arm;
   a first cutting implement removably coupleable with the carrier; and
   a first retention hub selectively coupleable with the retention fitting.

2. The kit of claim 1, wherein:
   the first cutting implement is a slicing implement selectively coupleable with the carrier and including a first coring blade and a first slicing blade thereon; and
   the kit further includes a shredding implement selectively coupleable with the carrier and including a second coring blade, a second slicing blade, and a plurality of radial cutting blades thereon.

3. The kit of claim 2, wherein a first cutting implement and a second cutting implement are selectively alternately engageable with the carrier.

4. The kit of claim 1, wherein the first retention hub is one of a plurality of retention hubs included in the kit and being selectively coupleable with the retention fitting.

5. The kit of claim 1, wherein the first retention hub includes a food skewer that extends along the axis of the retention fitting when the first retention hub is assembled therewith.

6. The kit of claim 1, further including a package with a plurality of wells respectively receiving each of the base unit, the slicing implement, the shredding implement, and the plurality of retention hubs.

7. The kit of claim 1, wherein the carrier slidably coupled with the frame arm and selectively operably engageable with the drive screw by a coupling arm extending from the carrier and moveable between a first position wherein the coupling arm is disengaged from the drive screw and a second position wherein a connection arm is engaged with the drive screw such that the rotational movement thereof drives the corresponding linear movement of the carrier along the frame arm.

8. The kit of claim 1, wherein the drive screw and the retention hub are linearly arranged with respect to the frame arm in sequential positions away from the first lateral side of the gear housing.

9. The kit of claim 1, further including a peeling arm rotatably coupled to a base block that is removably coupleable with the carrier, the peeling arm being spring-biased toward the drive screw when the base block is coupled with the carrier.

10. The kit of claim 1, wherein: the input hub is configured for attachment with a drive port of a motor driven device such that the device can drive rotation of the input hub and to support the food processing device with respect to the motor driven device such that the retention hub, the drive screw, and the frame arm are laterally arranged with respect to each other and are spaced equidistant from a work surface supporting the mixer.

11. A food processing system, comprising:
   a food processing base unit, including:
      a gear housing;
      a frame arm extending from the gear housing on a first lateral side thereof;
      a drive screw extending between and operably coupled on respective ends thereof with the gear housing and a support end of the frame arm;
      a retention fitting extending from the gear housing and rotatable about an axis that extends generally parallel with and adjacent a portion of the drive screw;
      an input hub extending from the gear housing opposite the drive screw and the retention fitting and operably engaged with both the drive screw and the retention hub to drive synchronized rotational movement thereof with respect to the gear housing; and
      a carrier slidably coupled with the frame arm and operably engaged with the drive screw such that the rotational movement thereof drives corresponding linear movement of the carrier along the frame arm; and
   a first cutting implement and a second cutting implement, each being alternately coupleable with the carrier.

12. The system of claim 11, further including a first retention hub selectively coupleable with the retention fitting.

13. The system of claim 12, wherein the first retention hub is one of a plurality of retention hubs included in the kit and being selectively coupleable with the retention fitting.

14. The system of claim 12, wherein the first retention hub includes a food skewer that extends along the axis of the retention fitting when the first retention hub is assembled therewith.

15. The system of claim 11, wherein:
   the first cutting implement is a slicing implement selectively coupleable with the carrier and including a first coring blade and a first slicing blade thereon; and
   the second cutting implement is a shredding implement selectively coupleable with the carrier and including a second coring blade, a second slicing blade, and a plurality of radial cutting blades thereon.

16. The system of claim 11, wherein the carrier slidably coupled with the frame arm and selectively operably engageable with the drive screw by a coupling arm extending from the carrier and moveable between a first position wherein the coupling arm is disengaged from the drive screw and a second position wherein a connection arm is engaged with the drive screw such that the rotational movement thereof drives the corresponding linear movement of the carrier along the frame arm.

17. The system of claim 11, wherein the drive screw and the retention hub are linearly arranged with respect to the frame arm in sequential positions away from the first lateral side of the gear housing.

18. The kit of claim 11, further including a peeling arm rotatably coupled to a base block that is removably coupleable with the carrier, the peeling arm being spring-biased toward the drive screw when the base block is coupled with the carrier.

19. The system of claim 11, further including a motor-driven mixing device including a drive port, wherein:
   the input hub of the food processing base unit is configured for attachment with the drive port of a motor driven mixing device such that the device can drive rotation of the input hub and to support the food processing device with respect to the motor driven device.

20. The system of claim 19, wherein the input hub of the food processing base unit is further configured for attachment with the drive port of a motor driven mixing device such that the retention hub, the drive screw, and the frame arm are laterally arranged with respect to each other and are spaced equidistant from a work surface supporting the mixer.

* * * * *